United States Patent [19]
Krebs et al.

[11] Patent Number: 5,880,167
[45] Date of Patent: Mar. 9, 1999

[54] POLYURETHANE COMPOSITIONS WITH A LOW CONTENT OF MONOMERIC DIISOCYANATES

[75] Inventors: Michael Krebs, Hilden; Gerd Bolte, Monheim; Christa Dernst-Mentges, Leimen; Guenter Henke, Neuss; Wolfgang Klauck, Meerbusch; Hermann Kluth, Duesseldorf; Manfred Schumann, Heidelberg, all of Germany

[73] Assignee: Henkel Kommanditgesellschaft auf Aktien, Duesseldorf, Germany

[21] Appl. No.: 793,024

[22] PCT Filed: Aug. 14, 1995

[86] PCT No.: PCT/EP95/03216

§ 371 Date: Mar. 27, 1997

§ 102(e) Date: Mar. 27, 1997

[87] PCT Pub. No.: WO96/06124

PCT Pub. Date: Feb. 29, 1996

[30] Foreign Application Priority Data

Aug. 22, 1994 [DE] Germany ............................ 44 29 679.7
Nov. 11, 1994 [DE] Germany ............................ 44 40 322.4
Nov. 18, 1994 [DE] Germany ............................ 44 41 190.1
Nov. 23, 1994 [DE] Germany ............................ 44 41 570.2
Nov. 24, 1994 [DE] Germany ............................ 44 41 770.5

[51] Int. Cl.$^6$ ............................ C08L 75/04; C08G 18/72
[52] U.S. Cl. ............................ 521/155; 521/159; 525/123; 525/127; 525/128; 525/395; 525/409; 525/440; 528/67; 528/76; 528/80; 528/83
[58] Field of Search .................................. 528/67, 76, 80, 528/83; 525/123, 409, 440, 395, 127, 128; 521/155, 159

[56] References Cited

U.S. PATENT DOCUMENTS

| | | | |
|---|---|---|---|
| 4,742,087 | 5/1988 | Kluth et al. ............................ | 521/107 |
| 4,864,025 | 9/1989 | Robin et al. ............................ | 544/222 |
| 4,888,442 | 12/1989 | Dunlap et al. .......................... | 560/352 |
| 4,910,332 | 3/1990 | Kahl et al. ............................... | 860/351 |
| 4,963,675 | 10/1990 | Robin et al. ............................ | 544/222 |
| 5,356,943 | 10/1994 | Dueber et al. .......................... | 521/124 |
| 5,461,091 | 10/1995 | Hoffmann et al. ..................... | 523/415 |

FOREIGN PATENT DOCUMENTS

| | | |
|---|---|---|
| 0 105 242 | 4/1984 | European Pat. Off. . |
| 125 008 | 11/1984 | European Pat. Off. . |
| 0 273 836 | 7/1988 | European Pat. Off. . |
| 0 294 110 | 12/1988 | European Pat. Off. . |
| 0 316 738 | 5/1989 | European Pat. Off. . |
| 0 393 903 | 10/1990 | European Pat. Off. . |
| 0 537 602 | 4/1993 | European Pat. Off. . |
| 32 45 678 | 6/1984 | Germany . |
| 3245678 | 6/1984 | Germany . |
| 36 26 223 | 2/1988 | Germany . |
| 39 11 784 | 10/1990 | Germany . |
| 40 25 843 | 2/1992 | Germany . |
| 43 03 887 | 4/1994 | Germany . |
| 834 917 | 1/1957 | United Kingdom . |

OTHER PUBLICATIONS

GPC–Analyse des Gehaltes an monomerem Diisocyanat in Prepolymeren von segmentierten Polyurethanen, Colloid and Polymer Sci., 260, (1982) pp. 518–523.

Kunststoff–Handbuch, vol. 7, Polyurethane, G.W. Becker (editor), Hanser Verlag Munchen, 3rd Edition, 1993, p. 97 and p. 425.

*Primary Examiner*—Patricia A. Short
*Attorney, Agent, or Firm*—Ernest G. Szoke; Wayne C. Jaeschke; Real J. Grandmaison

[57] ABSTRACT

The invention relates to polyurethane compositions with a low content of monomeric diisocyanates. Trifunctional isocyanates optionally reduced in their functionality to 3.0±0.7 with a monofunctional terminator are preferably used for this purpose. In this way, the compositions contain considerably smaller quantities of readily volatile isocyanates. The compositions are suitable for use as reactive hotmelt adhesives, lamination adhesives, adhesive/sealing compounds, primers and for the production of foam plastics from non-reusable pressurized containers (aerosol cans). The low content of volatile monomeric diisocyanates enables the need for safety measures in the workplace to be significantly reduced, in addition to which the disposal of residues remaining in the containers is made considerably easier.

27 Claims, No Drawings

POLYURETHANE COMPOSITIONS WITH A LOW CONTENT OF MONOMERIC DIISOCYANATES

FIELD OF THE INVENTION

This invention relates to compositions based on polyols and polyisocyanates with a low content of monomeric diisocyanates and to their production and use as a reactive hotmelt adhesive, lamination adhesive, adhesive/sealing compound, reactive primer or foam plastic from non-reusable pressurized containers.

BACKGROUND OF THE INVENTION

Reactive polyurethane hotmelt adhesives in the context of the present invention are moisture-curing or moisture-crosslinking adhesives which are solid at room temperature, which are applied in the form of a melt and of which the polymeric constituents contain urethane groups and reactive isocyanate groups. Cooling of the melt results first in rapid physical setting of the hotmelt adhesive followed by a chemical reaction of the isocyanate groups still present with moisture from the environment to form a crosslinked infusible adhesive.

Lamination adhesives may either be similar in composition to reactive hotmelt adhesives or are applied as one-component systems from solutions in organic solvents, another embodiment consisting of two-component solvent-containing or solventless systems in which the polymeric constituents of one component contain urethane groups and reactive isocyanate groups while the second component contains polymers or oligomers bearing hydroxyl groups, amino groups, epoxy groups and/or carboxyl groups. In these two-component systems, the component containing isocyanate groups and the second component are mixed immediately before application, normally using a mixing and metering system.

Reactive polyurethane adhesive/sealing compound, more particularly one-component moisture-curing systems, generally contain polymers liquid at room temperature containing urethane groups and reactive isocyanate groups. For many applications, these compositions are solvent-free and extremely viscous and paste-like, being applied at room temperature or at a slightly elevated temperature of around 50° C. to 80° C.

Moisture-curing or moisture-crosslinking polyurethane primers are primers of which the polymeric constituents contain urethane groups and reactive isocyanate groups. In general, these compositions contain solvents and are applied at room temperature. To accelerate evaporation of the solvent, the substrates precoated with the primer may optionally be lightly heated.

Foam plastics from non-reusable pressurized containers in the context of the present invention are produced where they are to be used so that they are also known as in situ foam (DIN 18159). The systems in question are, in particular, moisture-curing one-component systems. The composition to be foamed is generally accommodated in non-reusable pressurized containers (aerosol cans). These polyurethane foams are used above all in the building field for sealing, insulation and assembly, for example of joints, roofs, windows and doors.

Reactive polyurethane compositions based on prepolymers of polyols and polyisocyanates and other additives are used in all these fields of application. In the case of the one-component formulations, the isocyanate groups still present react with moisture from the surrounding atmosphere, the reaction being accompanied by crosslinking and—in the case of the foams—an increase in volume. In the case of the two-component systems, chemical curing is accompanied by enlargement of the molecule or crosslinking of the molecule with the hydroxyl groups, amino groups, epoxy groups or carboxyl groups of the second reactive component.

The reactive polyurethane compositions for the applications mentioned above are distinguished by a very high performance profile. Accordingly, new applications for these adhesive compounds, sealants, foams and primers have been increasingly established over recent years. Compositions for such adhesives, sealing compounds, foams and primers are already known from a very large number of patent applications and other publications.

In addition to many advantages, the polyurethane compositions in question are also attended by certain disadvantages inherent in the system. One of the most serious of these is the residual monomer content of polyisocyanates, more particularly the more volatile diisocyanates. Adhesives, sealing compounds and, in particular, hotmelt adhesives are applied at elevated temperatures. Hotmelt adhesives are applied, for example, at 100° to 170° C. while lamination adhesives are applied at 70° to 150° C. At temperatures in these ranges, monomeric diisocyanates have a considerable vapor pressure. Primers are normally applied by spraying. The isocyanate vapors formed in all these methods of application are toxic on account of their irritant and sensitizing effect, so that precautionary measures have to be taken to prevent damage to the health of personnel involved in the application process. These measures, including for example the obligation to ensure that the maximum workplace concentration is not exceeded, extraction of the vapors at the point of formation and elimination, are highly cost-intensive and, in addition, are an obstacle to certain methods of application, for example spraying, of the reactive polyurethane compositions. The special problems posed by polyurethane foams from aerosol cans will be discussed hereinafter.

Accordingly, the development of reactive polyurethane compositions with a drastically reduced content of monomeric diisocyanates is highly desirable for all the applications mentioned and, in some cases, would actually enable them to be used for the very first time in many applications where their use has not hitherto been possible for the reasons explained above.

Several methods have hitherto been adopted to solve this problem:

According to the Schulz-Flory statistic, the content of monomeric diisocyanate in the reaction product where diisocyanates containing isocyanate groups of equal reactivity are used is dependent on the NCO:OH ratio used in the synthesis of the prepolymer:

$$\beta = \left[ \frac{\alpha - 1}{\alpha} \right],$$

where $\beta$ is the content of monomeric diisocyanate and $\alpha$ is the NCO:OH ratio (see, for example, R. Bonart, P. Demmer, GPC-Analyse des Gehaltes an monomerem Diisocyanat in Prepolymeren von segmentierten Polyurethanen (GPC Analysis of the Content of Monomeric Diisocyanate in Prepolymers of Segmented Polyurethanes, Colloid and Polymer Sci., 260 518–523 (1982)). With an NCO:OH ratio of 2, as frequently necessary for the composition of the prepolymer, 25% of the diisocyanate used remain as monomer in the prepolymer. If, for example, 10% by weight of diphenyl methane diisocyanate (MDI) are used for synthesis of the prepolymer at an NCO:OH ratio of 2, approximately 2% by weight of monomeric MDI is found in the prepolymer in accordance with the above statistical estimation. At an application temperature of 150° C., the MDI already has a vapor pressure of around 0.8 mbar. Under the application conditions described above, particularly if the composition is applied in thin layers as an adhesive over large surface areas, considerable quantities of this residual monomer enter the overlying air space and have to be removed by extraction.

To reduce this monomer content by one power of ten, the NCO:OH ratio would have be drastically reduced to around 1.19. However, this is generally not practicable in practice because the average molecular weight would increase exponentially and the resulting polyurethane compositions would have extremely high viscosities and could no longer be applied. In practice, therefore, different methods are adopted for synthesis of the prepolymer. For example, the prepolymer is synthesized with a sufficiently high NCO:OH ratio and, after formation of the prepolymer, the monomeric diisocyanate or polyisocyanate is removed in a second step, for example by

- distillation in vacuo (thin-layer evaporator), see for example Kunststoff-Handbuch, Vol. 7, Polyurethane, G. W. Becker (editor), Hanser Verlag München, 3rd Edition, 1993, page 425,
- subsequent chemical fixing of the monomeric diisocyanate or polyisocyanate, for example by partial trimerization and working up of the reaction mixture, cf. for example the reference from loc. cit., page 97: K. C. Frisch, S. L. Reegen (editors): Advances in Urethane Science and Technology, Vol. 1–7, Technomic, Westport, Conn., 1971–1979.

These processes are applied, for example, in the production of low-viscosity adducts or solvent-containing adducts such as, for example, hardeners for paint binders. In the case of the highly viscous polyurethane adhesives, they have not acquired any significance on account of the high outlay on equipment they necessitate.

Accordingly, the problem addressed by the invention was to provide a reactive polyurethane composition in which the content of monomeric volatile isocyanates (essentially diisocyanates) would be so low that there would no longer be any need for expensive extraction or other safety measures during their practical application for reasons of safety in the workplace. In the case of the foam plastics, the disposal of residues of the prepolymers remaining in the non-reusable pressurized containers would not be problematical. The special problems involved are discussed hereinafter.

SUMMARY OF THE INVENTION

The solution to this problem as provided by the invention is characterized in that the reactive component of the composition consists of prepolymers based on diols and/or polyols and polyisocyanates, the polyisocyanates having an isocyanate functionality of 3±0.7 and containing less than 20% by weight of diisocyanate.

DETAILED DESCRIPTION OF THE INVENTION

The functionality of the polyisocyanate may optionally be adjusted to the required range by the addition of monofunctional compounds (terminators). The content of diisocyanate monomers in the prepolymer and in the composition is determined by HPLC (high pressure liquid chromatography).

Surprisingly, the use of diols and/or polyols and such polyisocyanates with a functionality well above 2 in the production of the prepolymer does not lead to premature crosslinking or gelation, so that these compositions have a suitable viscosity for the production of hotmelt adhesives, lamination adhesives, adhesive/sealing compounds, primers and foam plastics.

Suitable polyisocyanates are, primarily, aromatic triisocyanates such as, for example, thiophosphoric acid tris-(p-isocyanatophenyl ester), triphenyl methane-4,4',4"-triisocyanate and, in particular, the various isomeric trifunctional homologs of diphenyl methane diisocyanate (MDI). The homologs in question mainly include isocyanato-bis-((4-isocyanatophenyl)-methylbenzene, 2-isocyanato-4-((3-isocyanatophenyl)-methyl)-1-((4-isocyanatophenyl)-methyl)-benzene, 4-isocyanato-1,2-bis-((4-isocyanatophenyl)-methyl)-benzene, 1-isocyanato-4-((2-isocyanatophenyl)-methyl)-2-((3-isocyanatophenyl)-methyl)-benzene, 4-isocyanato-α-1-(o-isocyanatophenyl)-α,3-(p-isocyanatophenyl)-m-xylene, 2-isocyanato-α-(o-isocyanatophenyl)-α'-(p-isocyanatophenyl)-m-xylene, 2-isocyanato-1,3-bis-((2-isocyanatophenyl)-methyl)-benzene, 2-isocyanato-1,4-bis-((4-isocyanatophenyl)-methyl)-benzene, isocyanato-bis-((isocyanatophenyl)-methyl)-benzene, 1-isocyanato-2,4-bis-((bis-((4-isocyanatophenyl)-methyl)-benzene and mixtures thereof, optionally with a small amount of higher homologs. Since the trifunctional homologs of diphenyl methane diisocyanate are produced similarly to diphenyl methane diisocyanate by condensation of formaldehyde with aniline and subsequent phosgenation, the technical mixture of the trifunctional homologs of MDI also contains diisocyanate, although it should not be present in quantities of more than 20% by weight, based on the isocyanate mixture. The percentage content of tetraisocyanates in this homolog mixture should be not more than 12% by weight and the percentage content of polyisocyanates having a functionality of more than 4 no more than 2% by weight.

In addition, adducts of diisocyanates and low molecular weight triols, more particularly the adducts of aromatic diisocyanates and triols, for example trimethyol propane or glycerol, are also suitable as triisocyanates. The above-mentioned limitations in regard to the diisocyanate content and the content of polyisocyanates with a functionality of more than 3 apply to these adducts also. Aliphatic triisocyanates, such as for example the biuretization product of hexamethylene diisocyanate (HDI) or the isocyanuratization of HDI or even the same trimerization products of isophorone diisocyanate (IPDI) are also suitable for the compositions according to the invention providing the percentage content of diisocyanates is less than 0.5% by weight and the percentage content of tetra- and higher isocyanates is no more than 14% by weight.

The viscosity of the reactive component may optionally be adjusted with monofunctional compounds (terminators) containing isocyanate-reactive groups.

The addition of monofunctional compounds to isocyanate prepolymers is already known in principle. Thus, EP-A-125 008 describes a process for bonding soles to shoe uppers. In the case of the adhesive described in this document, a diisocyanate is first reacted with a substantially linear hydroxyfunctional polyester so that a prepolymer containing reactive terminal isocyanate groups is formed. This hotmelt adhesive contains a monofunctional compound as a further component. This monofunctional compound is present in the hotmelt adhesive in a quantity sufficient to react with up to 40 mole % of the isocyanate groups of the prepolymer. It is stated that the monofunctional compound has a considerable bearing on maintenance of the heat activatability of the adhesive composition described in this document. However, this process only reduces the content of monomeric diisocyanate to a very small extent because, in approximate terms, the monofunctional compound reacts equally quickly both with the monomeric isocyanate groups and with the polymer-bound isocyanate groups.

According to the invention, suitable monofunctional compounds (terminators) are compounds which contain isocyanate-reactive groups having a functionality of 1. Basically, any monofunctional alcohols, amines or mercaptans may be used for this purpose, including in particular monofunctional alcohols containing up to 36 carbon atoms, monofunctional primary and/or secondary amines containing up to 36 carbon atoms or monofunctional mercaptans containing up to 36 carbon atoms. However, mixtures of polyalcohols, polyamines and/or polymercaptans may also be used as terminators providing their average functionality is below 2. For example, monoalcohols, such as benzyl alcohol, fatty alcohols containing 8 to 18 carbon atoms commercially obtainable, for example, under the name of Lorol from Henkel KGaA, abietyl alcohol and hydrogenated abietyl alcohol are suitable. The abietyl alcohols act both as chain terminators and as chemically bound tackifiers. The addition of mercapto- or aminosilanes may also perform a dual function as chain terminator and coupling agent.

By means of the terminators mentioned above, the effective functionality of the triisocyanate can be adjusted to a value of 1.2 to 3.45, the functionality of the triisocyanate originally used being dependent upon its content of difunctional homologs and homologs with a functionality of more than 3. In the particularly preferred trifunctional homolog mixtures of MDI, the functionality of the triisocyanate mixture originally used is between 2.3 and 3.7 and preferably between 2.55 and 3.45. Basically, however, the triisocyanate may also be used without the addition of terminators. The type and quantity of terminators used depend on the required crosslink density of the cured adhesive, sealing compound or foam and/or on the required application viscosity.

The reaction of the polyisocyanate with the terminator may take place in a separate step or, preferably, is integrated into the production process. There is no need to remove the reaction products with the terminator from the composition. Accordingly, subsequent working up of the reaction mixture, as necessary in the production of many low-viscosity adducts of the prior art, is not necessary. The reaction mixture may be made up without any need for purification into the corresponding adhesive, sealing compound or the foamable composition. The production of these compositions with their low content of monomeric diisocyanates and a suitably low viscosity is thus very economical.

Suitable polyols for the production of the prepolymers are any of the usual hydroxyfunctional polyesters, polyethers or polybutadienes with an OH functionality of or greater than 2. Although difunctional compounds are preferred for most applications, higher polyols may also be used, at least in small quantities.

Suitable polyester polyols are reaction products of dicarboxylic acids, preferably aliphatic dicarboxylic acids containing 4 to 12 carbon atoms in the alkylene moiety, with diols, these reaction products having to contain free OH groups for the reaction. Examples of aliphatic dicarboxylic acids are succinic acid, adipic acid, pimelic acid, glutaric acid, azelaic acid, sebacic acid, decanedioic acid or dodecanedioic acid. Aromatic dicarboxylic acids, such as phthalic acid, isophthalic acid and terephthalic acid may also be used. Ethylene glycol, diethylene glycol, triethylene glycol, 1,2- and 1,3-propylene glycol, butane-1,4-diol, hexane-1,6-diol or higher diols may be used as the dihydric alcohols.

However, it is also possible to use polyester diols of oleochemical origin which do not contain any free epoxide groups and which have been produced by complete ring opening of epoxidized triglycerides of an at least partly olefinically unsaturated fatty-acid-containing fatty acid mixture with one or more $C_{1-12}$ alcohols and subsequent partial transesterification of the triglyceride derivatives to alkyl ester polyols containing 1 to 12 carbon atoms in the alkyl moiety (see DE 36 26 223).

Suitable polyether polyols are the products produced by known methods from one or more alkylene oxides containing 2 to 4 carbon atoms in the alkylene moiety and a starter molecule containing 2 or 3 active hydrogen atoms. Suitable alkylene oxides are, for example, tetrahydrofuran, propylene oxide, 1,2- and 2,3-butylene oxide and ethylene oxide. Suitable starter molecules are water, dicarboxylic acids, polyhydric alcohols, such as ethylene glycol, 1,2-propylene glycol, diethylene glycol, dipropylene glycol and dimerdiols (Henkel KGaA), bisphenol A, resorcinol, hydroquinone, glycerol or trimethylol propane.

Other suitable polyols are linear and/or lightly branched acrylate copolymer polyols which may be produced, for example, by the radical copolymerization of acrylates or methacrylates with hydroxyfunctional acrylic acid and/or methacrylic acid compounds, such as hydroxyethyl (meth) acrylate or hydroxypropyl (meth)acrylate. Because of this method of production, the hydroxyl groups in these polyols are generally statistically distributed, so that the polyols are either linear or lightly branched polyols with an average OH functionality. Although the difunctional compounds are preferred for the polyols, higher polyols may also be used, at least in small quantities.

The isocyanate prepolymers are prepared in known manner from the polyisocyanates and the diols and/or polyols.

The composition according to the invention may additionally contain catalysts which accelerate the formation of the polyurethane prepolymer during its production and/or which accelerate moisture crosslinking after application. Suitable catalysts are the normal polyurethane catalysts such as, for example, compounds of divalent and tetravalent tin, more particularly the dicarboxylates of divalent tin and the dialkyl tin dicarboxylates or dialkoxylates. Examples include dibutyl tin dilaurate, dibutyl tin diacetate, dioctyl tin diacetate, dibutyl tin maleate, tin(II) octoate, tin(II) phenolate or even the acetyl acetonates of divalent or tetravalent tin. In addition, the highly effective tertiary amines or amidines may be used as catalysts, optionally in combination with the tin compounds mentioned above. Suitable amines are both acyclic and, in particular, cyclic compounds. Examples include tetramethyl butanediamine, bis (dimethylaminoethyl)ether, 1,4-diazabicyclooctane (DABCO), 1,8-diazabicyclo-(5.4.0)-undecene, 2,2'-dimorpholinodiethyl ether or dimethyl piperazine or even mixtures of the amines mentioned.

Dimorpholinodiethyl ether or bis(dimethylaminoethyl) ether is preferably used as the catalyst. It should only catalyze the reaction of the NCO group with OH groups and the reaction of the NCO group with moisture, but not the trimerization reaction during storage.

In addition, the composition according to the invention may optionally contain stabilizers. "Stabilizers" in the context of the present invention are, on the one hand, stabilizers which stabilize the viscosity of the polyurethane prepolymer during production, storage and application. Stabilizers suitable for this purpose are, for example, monofunctional carboxylic acid chlorides, monofunctional highly reactive isocyanates and also non-corrosive inorganic acids, for example benzoyl chloride, toluene sulfonyl isocyanate, phosphoric acid or phosphorous acid. Other suitable stabilizers in the context of the invention are antioxidants, UV stabilizers and hydrolysis stabilizers. The choice of these stabilizers is determined on the one hand by the principal components of the composition and on the other hand by the application conditions and the stressing which the cured product can be expected to undergo. If the polyurethane prepolymer consists predominantly of polyether units, antioxidants, optionally in combination with UV stabilizers, are mainly required. Examples of such stabilizers are the commercially available sterically hindered phenols and/or thioethers and/or substituted benzotriazoles or the sterically hindered amines of the HALS (hindered amine light stabilizer) type.

If the polyurethane prepolymer consists largely of polyester units, hydrolysis stabilizers, for example of the carbodiimide type, are preferably used.

The other typical additives are determined by the specific fields of application envisaged for the compositions and, accordingly, are separately described for each field of application.

If the compositions according to the invention are used as hotmelt adhesives, lamination adhesives or adhesive/sealing compounds, they may contain tackifying resins, for example abietic acid, abietic acid esters, terpene resins, terpene/phenol resins or hydrocarbon resins, and also fillers (for example silicates, talcum, calcium carbonates, clays or carbon black), plasticizers (for example phthalates) or thixotropicizing agents (for example Bentones, pyrogenic silicas, urea derivatives, fibrillated or pulped chopped strands) or dye pastes or pigments.

Where the compositions according to the invention are used as lamination adhesives, epoxy resins, phenolic resins, novolaks, resols or melamine resins and the like may have to be added to achieve certain additional properties, such as thermal and chemical stability. In addition, the prepolymers may even be prepared in the form of solutions, preferably in polar aprotic solvents, in this case. The preferred solvents have a boiling range of around 50° C. to 140° C. Although halogenated hydrocarbons are also suitable, ethyl acetate, methyl ethyl ketone (MEK) and acetone are most particularly preferred.

Where the compositions according to the invention are used as a primer, the solvents mentioned above are again used.

Where the compositions according to the invention are used for the production of foam plastics from non-reusable pressurized containers, the compositions also contain blowing agents, preferably 1,1,1,2-tetrafluoroethane, 1,1-difluoroethane and dimethyl ether. However, other blowing agents, such as carbon dioxide, dinitrogen oxide, n-propane, n-butane and isobutane, may also be used.

In addition, these foamable compositions contain foam stabilizers, preferably siloxane/oxyalkylene copolymers, for example Tegostab B 8404 (Goldschmidt), DABCO DC-190 or DABCO DC-193 (Air Products). They may also contain other additives, for example solvents (see above), flameproofing agents, plasticizers, cell regulators, emulsifiers, fungicides and also fillers, pigments and antiagers.

There are no critical aspects to the composition of the NCO prepolymers for the foamable compositions. This is because, according to the prior art, the prepolymer is almost always directly produced in the pressurized containers from mixtures of technical diphenyl methane-4,4'-diisocyanate (MDI) with a functionality of 2.3 to 2.7 and polyols with an NCO:OH ratio of 3–10 and preferably 4–6:1 in the presence of a tertiary amine as catalyst. On account of the excess of MDI, free unreacted MDI is still present in large quantities of the order of 7 to 15% by weight, based on the total content of the pressurized container. On account of this content of monomeric MDI, the compositions have to be labeled as harmful by inhalation, "harmful to health", "contains diphenyl methane-4,4'-diisocyanate" and with the "St. Andrews cross" danger symbol. If more readily volatile polyisocyanates were to be used instead of MDI for the production of the prepolymer, the reaction mixtures would likewise contain relatively large quantities of unreacted diisocyanate. Under the law on hazardous materials, these products would even have to be labeled as "toxic" and with the "death's head" danger symbol. On account of this increased toxicity, readily volatile diisocyanates have not been used in insulation and assembly foams from aerosol cans. In addition, the cure times of prepolymers of aliphatic or cycloaliphatic diisocyanates are too short for use as one-component insulation and assembly foams. Accordingly, only MDI is actually used for this purpose.

The foam plastics produced from the prepolymer are not a problem because the free MDI reacts with water and is thus firmly attached to the crosslinked polyurethane as a urea unit.

By contrast, the disposal of residues of such prepolymers in the non-reusable pressurized containers is problematical. Under current legislation on the disposal of waste in Germany, they have to be disposed of as special waste. The costs involved in their disposal are continuing to increase on account of the limited availability of disposal sites. Accordingly, there is a need for insulation and assembly foams of which residues or waste are easy to dispose of.

The production of polyurethane foams as a one-component system from a pressurized container using technical MDI is known in principle and is described, for example, in DE 40 25 843, in DE 39 11 784 and in DE 43 03 887. The problems involved in the disposal of residues of the prepolymers in the non-reusable pressurized containers are not discussed in any of the cited prior art documents.

The reactive component of the foamable composition according to the invention is characterized by the following features: it has a content of diisocyanate monomers of less than 5.0% by weight, more particularly less than 2.0% by weight and, above all, less than 1.0% by weight, based on the prepolymer. It has an NCO functionality of 2 to 5, more particularly from 2.5 to 4.2, and an NCO content of 8 to 30% by weight and, more particularly, from 10 to 23% by weight, based on the prepolymer, and also a viscosity of 5 to 200 and, more particularly, 10 to 100 Pas at 25° C. (according to DIN 53015). The prepolymers are prepared from diols and/or polyols and a polyisocyanate with an isocyanate functionality of 3.0±0.7 containing less than 20% by weight of diisocyanate, based on the polyisocyanate.

In quantitative terms, the content of the pressurized containers is preferably made up as follows:

50 to 90 and preferably 60 to 85% by weight of isocyanate prepolymers, 0.1 to 5.0 and preferably 0.5 to 2.0% by weight of catalysts, 5 to 35 and preferably 10 to 25% by weight of blowing agents and 0.1 to 5.0 and preferably 0.5 to 3.0% by weight of foam stabilizer.

Of the optional additives, the flameproofing agent may be added in a quantity of 5 to 50% by weight and preferably 10 to 30% by weight. The other optional additives may be added in a quantity of 0.1 to 3.0% by weight and, more particularly, 0.2 to 1.5% by weight. These figures are based on the composition as a whole.

The foamable compositions according to the invention provide for the production of a one-component plastic foam which cures in the usual way on contact with atmospheric moisture. However, a two-component plastic foam is also readily possible providing a polyol is added to the composition in an equivalent quantity or in slightly less than the equivalent quantity. The polyol may be any of the polyols typically used containing 2 to 6 carbon atoms and 2 or 3 preferably primary OH groups.

The plastic foam thus produced is particularly suitable for insulation, assembly and sealing in the building field, particularly in situ.

The following preferred Examples from the special fields of application are intended to illustrate the invention without limiting its scope in any way. In the Examples, quantities are parts by weight or percentages by weight, unless otherwise indicated.

EXAMPLE 1

A foamable composition for the production of a foam plastic from non-reusable pressurized containers 60 g of the polyisocyanate with a functionality f of 2.9 and an NCO content of 29.0%, which had been obtained by phosgenation of an aniline/formaldehyde condensate and which contains around 15% of MDI isomers and around 12% of MDI homologs with F=4, were mixed with 10.0 g of a polyester diol, OH value 10, and 10.0 g of tris(2-chloropropyl)phosphate, 0.4 g of dimorpholinodiethyl ether (DMDEE) and 2.0 g of a siloxane/oxyalkylene copolymer (Tegostab B8404) and, finally, 17.6 g of 1.1-difluoroethane. The composition obtained after prepolymerization had a favorable viscosity for processing as a one-component foam and, after curing, led to a foam with the following data:
Foam structure: fine cells
Density, g/l: 28
Dimensional stability (1 w, 40° C.): <3%
Burning behavior (DIN 4102): B2

EXAMPLE 2

A reactive hotmelt adhesive 133.4 Parts of Dynacoll 7360 (crystalline polyester, a product of Hüls), 66.6 parts of Dynacoll 7250 (liquid polyester, a product of Hüls) and 10.79 parts of benzyl alcohol are introduced into a heatable stirred tank reactor with a vacuum connection and are then freed from water in vacuo for 30 minutes at 130° C. until the water content was below 250 ppm. The vessel is then purged with nitrogen, after which 50.37 parts of thiophosphoric acid tris-(p-isocyanatophenyl ester) were added and vacuum was applied. The temperature is slowly increased to 150° C. and the reaction is continued until the isocyanate titration produces a constant value. The reaction product is then introduced into moisture-proof containers at at least 140° C. to 150° C., after which the containers are immediately sealed.

In this case, chain termination leads to a calculated functionality of the isocyanate of 2.0. In the preparation of the prepolymer, the effective NCO:OH ratio was 2.1:1, based on polyol OH. In this Example, both reactions took place in a single-stage process.

The hotmelt adhesive had the following properties: viscosity at 150° C. 57.5 Pas (Brookfield viscosimeter). The adhesion test produced the following results (1=very good, 5=unsatisfactory):
ABS: 1, rigid PVC: 1, polystyrene: 1–2, beech wood: 1

EXAMPLE 3

A hotmelt adhesive was produced by a single-stage process as in Example 2 from 133.4 parts of Dynacoll 7360, 66.6 parts of Dynacoll 7250, 14.4 parts of benzyl alcohol and 47.9 parts of triphenyl methane-4,4',4"-triisocyanate. The functionality of the isocyanate is reduced from f=3.0 to f=1.89 by addition of the benzyl alcohol as terminator. The NCO:OH ratio, based on polyol and isocyanate, is 2,28/1.0.

The hotmelt adhesive had a Brookfield viscosity at 150° C. of 30.0 Pas.

The residual monomer content of monomeric triphenyl methane triisocyanate was 0.3% to 0.4%, based on the adhesive composition. It was determined by gel permeation chromatography (GPC) using calibrating substances.

In order to be able to evaluate the adhesion properties of the hotmelt adhesive, ABS was bonded to ABS, rigid PVC to rigid PVC and wood to wood.
Area A: 25×15×0.2 mm.
Application temperature: 150° C.–170° C.

In accordance with DIN 53283, the tensile shear strengths were determined at a tear rate v of 100 mm/min.
After 1 h at room temperature (RT)
ABS: 3.152N/mm$^2$
PVC: 2.360N/mm$^2$
Wood: 3.180N/mm$^2$
After 7 d at room temperature (RT)
ABS: 4.487N/mm$^2$
PVC: 6.613N/mm$^2$ (Material failure)
Wood: 6.427N/mm$^2$ (Material failure)
Peel strengths (180° T peel-off test)
Peel strength was determined in accordance with DIN 53278 (v=100 m/min.).
Bonded material: foamed flexible PVC.
After 1 h at room temperature (RT)
8.25–9.125N/mm$^2$

EXAMPLE 4

A control comparison to Example 2

A hotmelt adhesive was prepared as in Example 2 from 133.4 parts of Dynacoll 7360, 66.6 parts of Dynacoll 7250 and 24.96 parts of MDI.

This hotmelt adhesive had a Brookfield viscosity at 150° C. of 4.7 Pa.s. A residual monomer content of 2.15% by weight of MDI was determined by GPC.

Accordingly, in the comparison test according to the prior art, a much higher monomeric isocyanate content is found. In addition, the vapor pressure of this isocyanate (MDI) is higher by about one order of magnitude than that of the polyisocyanate of Example 2 used in accordance with the invention.

The hotmelt adhesives according to the invention are suitable for all the usual applications of reactive hotmelt adhesives, including for example assembly bonding, for example so-called clip bonding in the assembly of interior trim parts of automobiles and edge banding in furniture production. In addition, the hotmelt adhesives according to the invention are suitable for large-area bonding as used, for example, for lamination in the automotive industry and for profile sheathing in the wood and furniture industry and in other fields of application. Other examples of application include the use of the adhesives in the production of books for spine gluing and as a coating material, for example for providing car mirrors with shatter protection. The hotmelt adhesives according to the invention may also be used for the production of air and oil filters. The hotmelt adhesives according to the invention may generally be used for bonding and sealing, for filling plugs and cable joints and for the production of moldings in an injection-molding-like application.

EXAMPLES 5 TO 8

Lamination adhesives

The hydroxyfunctional components listed in Table 1 below were introduced into a heatable and coolable stirred tank reactor and homogenized at 50° C. After addition of the isocyanate component, the mixture was stirred at 90° C. until the isocyanate content remained constant.

EXAMPLE 9

The compositions of Example 9 as listed in Table 1 were prepared similarly to Examples 4 to 7 except that the reaction was carried out in ethyl acetate at the reflux temperature thereof.

EXAMPLES 10 TO 14

Control comparisons to Examples 4 to 8, respectively

An isocyanate prepolymer was prepared as in Examples 4 to 8 except that, instead of the triphenyl methane triisocyanate and the benzyl alcohol, dimethyl methane diisocyanate (MDI) was used in accordance with the prior art. In every case, considerably higher residual monomer contents were found: Example 10 9%, Example 11 9%, Example 12 4%, Example 13 38% and Example 14 1.5%.

Bonding

Various substrates were bonded with the adhesives of Examples 5 to 9 and Comparison Examples 10 to 14. The compositions of Examples 5, 10, 7 and 12 were used in one-component form; a hydroxyfunctional hardener was used for the compositions of Examples 6–11, 9 and 14; the compositions of Examples 8 and 13 were used as hardener component for an OH-containing adhesive. The results are set out in Table 2.

TABLE 1

|  | Example | | | | |
| --- | --- | --- | --- | --- | --- |
|  | 5 | 6 | 7 | 8 | 9 |
| Aromatic-aliphatic polyester, OH value 60 (% by weight) | — | 38 | — | — | 30.35 |
| Aliphatic polyester, OH value 60, (% by weight) | — | 12 | — | — | — |
| Aliphatic polyester, OH value 130 (% by weight) | 33.59 | — | — | — | — |

TABLE 1-continued

|  | Example | | | | |
| --- | --- | --- | --- | --- | --- |
|  | 5 | 6 | 7 | 8 | 9 |
| Polypropylene glycol MW 1000, OH value 109 (% by weight) | 16.74 | — | 57.84 | 6.75 | 6.78 |
| Benzyl alcohol (% by weight) | 5.78 | 2.8 | 5.84 | 5.3 | 4.92 |
| Triphenyl methane-4,4',4"-triisocyanate (% by weight) | 43.88 | 47.2 | 36.58 | 88.5 | 17.96 |
| Ethyl acetate (% by weight) | — | — | — | — | 40 |
| % NCO | 7 | 4.7 | 4.5 | 21.5 | 1.8 |
| Residual monomeric isocyanate (% by weight) | 1.6 | 1.4 | 0.8 | 5 | 0.3 |
| Solids content (% by weight) | 100 | 100 | 100 | 100 | 60 |
| NCO:OH ratio | 2.2:1 | 1.5:1 | 1.8:1 | 3.75:1 | 1.6:1 |

TABLE 2

|  | Bonded substrate | | |
| --- | --- | --- | --- |
| Example | Paper, film | Film, film | Film, metal |
| 5 | + | + | + |
| 6 | + | − | − |
| 7 | + | + | − |
| 8 | − | + | + |
| 9 | + | + | + |
| 10 | + | + | + |
| 11 | + | − | − |
| 12 | + | + | − |
| 13 | − | + | + |
| 14 | + | + | + |

As can be seen from this table, the adhesive properties of the adhesives according to the invention are entirely equivalent to those of the known adhesives. However, the adhesives according to the invention have a far lower percentage content of monomeric isocyanate in the composition. In addition, the monomeric isocyanate of the compositions according to the invention is considerably higher in its molecular weight and, accordingly, has a lower vapor pressure than the isocyanates according to the prior art.

The lamination adhesives according to the invention are suitable for all the standard applications of reactive polyurethane lamination adhesives, including for example bonding of interior trim parts in car manufacture, edge banding in furniture production and large-area bonding for lamination and profile sheathing in the wood and furniture industry and in the electrical and electronics industry.

The lamination adhesives according to the invention are particularly suitable for laminating various composite films, for example for bonding plastic films to metal foils or even for bonding paper webs to plastic films or metal foils. In addition, the plastic films may be made of any of the plastics typically used for film production, including for example polyethylene, polypropylene, polyester, PVC, polyamide or polyimide. Suitable metal foils are, for example, foils of aluminium, copper, tin or tin/lead alloys. Both the paper webs and the plastic films or metal foils may be lacquered or printed. Another application for the lamination adhesives according to the invention is the production of bags from blow-molded or woven tubular polyethylene or polypropylene films, the adhesive being used to bond the bottom or top part of the bag.

EXAMPLE 15
Production of a prepolymer for adhesive/sealing compounds 2000 g of a polyoxypropylene ether diol with a molecular weight of 2000 g/mole, 1000 g of a polyoxypropylene ether triol with a molecular weight of 6000 g/mole and 1825 g of diisononyl phthalate are introduced into a heatable stirred tank reactor and stirred in vacuo at 70° C. while dry nitrogen is passed through until the water content of the mixture is below 0.05% (around 1 h). 255 g of 1-hexanol are then added, after which 917.5 g of triphenyl methane-4,4',4'''-triisocyanate are introduced under nitrogen. After homogenization, 2.5 ml of a 10% solution of tin(II) octoate in xylene were added. After the exothermic reaction has abated, the reaction mixture is stirred at 80° C. until a constant isocyanate content of around 1.7% is reached. The prepolymer obtained is packed in moisture-proof containers.

The chain terminator 1-hexanol used in this Example reduces the functionality of the isocyanate used to 2.0 (calculated). The effective NCO:OH ratio is 2.0, based on the polyol OH groups.

EXAMPLE 16
A comparison control example to Example 15

A prepolymer consisting of 2000 g of the polyoxypropylene ether diol with a molecular weight of 2000 g/mole, 1000 g of the polyoxypropylene ether triol with a molecular weight of 6000 g/mole, 1555 g of diisononyl phthalate, 625 g of 4,4'-diphenyl methane diisocyanate (MDI) and 2,5 ml of a 10% solution of tin(II) octoate in xylene is prepared as in Example 15. A chain terminator is not added in this case because a difunctional isocyanate is used. The NCO content of the final prepolymer is around 2.0%. The NCO:OH ratio is 2.0 as in Example 1.

EXAMPLE 17
Production of an adhesive/sealing compound with the prepolymer of Example 15

1500 g of the prepolymer of Example 15, 348 g of diisononyl phthalate, 840 g of dried carbon black and 300 g of fine-particle chalk are homogeneously mixed in vacuo in a planetary mixer, the temperature of the mixture rising to around 60° to 70° C. 12 g of a 10% solution of dibutyl tin dilaurate (DBTL) in diisononyl phthalate are then added and stirred in in vacuo. A paste-like, stable compound is obtained and is hermetically packed in cartridges before cooling.

The skin forming time of this adhesive/sealing compound is around 40 mins.; curing after 24 h (standard climate 23/50) is at 3.5 mm. The residual monomer content of monomeric triphenyl methane triisocyanate in the compound was determined by gel permeation chromatography at 0.16%.

EXAMPLE 18
A comparison control example to Example 17
Production of an adhesive/sealing compound with the prepolymer of Example 16

An adhesive/sealing compound is produced as in Example 10 from 1500 g of the prepolymer of Example 16, 288 g of diisononyl phthalate, 900 g of dried carbon black, 300 g of fine-particle chalk and 12 g of a 10% DBTL solution.

The curing properties of this adhesive/sealing compound are very similar to those of Example 17. The residual monomer content of monomeric MDI was 0.84%.

Accordingly, in Example 18 which represents an adhesive/sealing compound according to the prior art, a distinctly higher monomeric isocyanate content is found than in Example 17 according to the invention. In addition, the vapor pressure of this isocyanate (MDI) is higher by about one order of magnitude than that of the polyisocyanate of Example 17 used in accordance with the invention.

The adhesive/sealing compounds according to the invention are suitable for all standard applications of reactive polyurethane adhesive/sealing compounds. The products may be both one-component moisture-curing products and also the faster setting two-component materials used for the accelerated buildup of strength. A very important application for the adhesive/sealing compounds according to the invention is in the automotive industry and associated supplier industries, for example for the direct glazing of windscreens, roof and cockpit bonding and the bonding of plastic parts. In addition, polyurethane adhesive/sealing compounds are already widely used in the building industry, the metal-processing industry and in container manufacture.

EXAMPLE 19
A reactive primer comparison control example to Examples 20 to 22

In a closed reactor, 80 g of an amorphous unsaturated polyester (OH value 4, Tg>50° C.) are dissolved while stirring under nitrogen in 165 g of dried butanone. 150 g of ethyl acetate and 78 g of dried carbon black are added to the clear solution and the mixture is dispersed for 20 h in a ball mill.

A mixture of 190 g of a prepolymer of 82 g of 4,4'-diphenyl methane diisocyanate and 108 g of polyether polyol, OH value 112 (NCO content 9%, viscosity 10 Pas), 220 g of dry propyl acetate, 210 g of butanone and 5 g of benzoyl chloride is added to the above mixture with vigorous stirring and the whole is then dispersed for another hour in a ball mill.

EXAMPLE 20

As in Example 19, except that the MDI/polyether prepolymer is replaced by 190 g of the reaction product of 80 g of triphenyl methane-4,4',4''-triisocyanate with 110 g of polyether polyol, OH value 112 (NCO content 9%, viscosity 22 Pas).

EXAMPLE 21

As in Example 20, the isocyanate groups of the prepolymer are partly saturated with 10 g of n-hexanol (NCO content 7%, viscosity 12 Pas).

EXAMPLE 22

As in Example 20, the isocyanate groups of the prepolymer are partly reacted with 20 g of N-methyl-3-aminopropyl trimethoxysilane (NCO content 6%, viscosity 14 Pas).

Test results

| Example | Flow time(s) |
| --- | --- |
| 19 | 15 |
| 20 | 20 |
| 21 | 14 |
| 22 | 15 | b) Crosshatch test after storage of a 50 $\mu$m (wet) coating for 24 h at 23° C./50% relative humidity

| Example | Crosshatch value (DIN 53151) |
|---------|------------------------------|
| 19 | GT 0 |
| 20 | GT 0 |
| 21 | GT 0 |
| 22 | GT 0 | c) Adhesion test to 1. white paint and 2. grey metallic paint

| Example | After 7 d SC | After 7 d SC and 7d 70° C./10% Rel.h |
|---------|--------------|--------------------------------------|
| 19 | 100% Cohesive | 100% Cohesive |
| 20 | " | " |
| 21 | " | " |
| 22 | " | " |

Legend
SC = Standard climate (23° C./50% relative air humidity)
Rel.h = Relative air humidity Legend
SC=Standard climate (23° C./50% relative air humidity)
Rel.h=Relative air humidity The primers according to the invention are suitable for many of the standard applications of reactive primers, but especially as primers on automotive paints of the type used, for example, in direct glazing. It is clear from the test results shown above that the primers according to the invention (Examples 20 to 22) are equivalent to the known primer (Example 19) in all their applicational properties. However, the primers according to the invention have a considerably lower residual monomer content. In addition, the triisocyanate has a vapor pressure lower by about one order of magnitude than the MDI according to the prior art.

What is claimed:

1. A reactive isocyanate group-containing composition comprising a prepolymer comprising the reaction product of polyols and polyisocyanates, and optionally monofunctional compounds containing isocyanate-reactive groups, wherein said polyisocyanates have an isocyanate functionality of 3.0±0.7 and contain less than 20% by weight of diisocyanate, up to 12% by weight of tetrafunctional isocyanate, and up to 2% by weight of higher polyisocyanates, based on the weight of said polyisocyanates.

2. A composition as in claim 1 wherein said polyisocyanates are selected from the group consisting of
   trifunctional homologs of diphenyl methane diisocyanate,
   triphenyl methane-4,4',4"-triisocyanate,
   thiophosphoric acid tris-(p-isocyanato)-phenyl ester,
   trimerization products of diphenyl methane diisocyanate,
   aliphatic triisocyanates, and
   adducts of diisocyanates and low molecular weight triols.

3. A composition as in claim 1 wherein said polyisocyanates comprise the condensation product of formaldehyde and aniline with subsequent phosgenation.

4. A composition as in claim 1 wherein the functionality of said polyisocyanates has been adjusted to a value of 1.2 to 3.45 by addition of monofunctional compounds containing isocyanate-reactive groups selected from the group consisting of monohydric alcohols containing up to 36 carbon atoms, monofunctional primary or secondary amines or mercaptans containing up to 36 carbon atoms, and mixtures of polyalcohols, polyamines and polymercaptans having a functionality of less than 2.

5. A composition as in claim 1 wherein said polyols are selected from the group consisting of polyether diols, polyether triols, linear or branched polyester polyols, linear or branched acrylate copolymer polyols, and aromatic polyether diols or polyols.

6. A composition as in claim 1 further containing a polyurethane catalyst.

7. A composition as in claim 1 further containing a stabilizer.

8. A composition as in claim 1 in the form of a one-component moisture-curing compound or a two-component adhesive/sealing compound.

9. A composition as in claim 1 in the form of a solvent-free lamination adhesive.

10. A composition as in claim 1 in the form of a hardener for an adhesive component containing hydroxyl groups, amino groups, epoxy groups or carboxyl groups.

11. A composition as in claim 1 in the form of a solvent-free primer for assembly bonding, large-area bonding or the coating of substrates.

12. A composition as in claim 1 which is moisture-curable.

13. A composition as in claim 1 in the form of an insulating foam.

14. A reactive hot-melt adhesive composition comprising the reaction product of polyols and polyisocyanates, and optionally, monofunctional compounds containing isocyanate-reactive groups, wherein said polyisocyanates have an isocyanate functionality of 3.0±0.7 and contain less than 20% by weight of diisocyanate, up to 12% by weight of tetrafunctional isocyanate, and up to 2% by weight of higher polyisocyanates, based on the weight of said polyisocyanates.

15. A composition as in claim 14 wherein said polyisocyanates are selected from the group consisting of
   trifunctional homologs of diphenyl methane diisocyanate,
   triphenyl methane-4,4',4"-triisocyanate,
   thiophosphoric acid tris-(p-isocyanato)-phenyl ester,
   trimerization products of diphenyl methane diisocyanate,
   aliphatic triisocyanates, and
   adducts of diisocyanates and low molecular weight triols.

16. A composition as in claim 14 wherein said polyisocyanates comprise the condensation product of formaldehyde and aniline with subsequent phosgenation.

17. A composition as in claim 14 wherein the functionality of said polyisocyanates has been adjusted to a value of 1.2 to 3.45 by addition of monofunctional compounds containing isocyanate-reactive groups selected from the group consisting of monohydric alcohols containing up to 36 carbon atoms, monofunctional primary or secondary amines or mercaptans containing up to 36 carbon atoms, and mixtures of polyalcohols, polyamines and polymercaptans having a functionality of less than 2.

18. A composition as in claim 14 wherein said polyols are selected from the group consisting of polyether diols, polyether triols, linear or branched polyester polyols, linear or branched acrylate copolymer polyols, and aromatic polyether diols or polyols.

19. A composition as in claim 14 further containing a polyurethane catalyst.

20. A composition as in claim 14 further containing a stabilizer.

21. A composition as in claim 14 in the form of a one-component moisture-curing compound or a two-component adhesive/sealing compound.

22. The process of producing a foamable composition from a non-reusable pressurized container comprising placing in said container a composition containing A) as a reactive component, at least one isocyanate prepolymer having a content of diisocyanate monomers of less than 5.0% by weight, based on the weight of said prepolymer, an NCO functionality of 2 to 5, an NCO content of 8 to 30% by weight, based on the weight of said prepolymer, and a viscosity of 5 to 200 Pa.s at 25° C. according to DIN 53015, said prepolymer having been obtained from a triisocyanate having an isocyanate functionality of 3.0±0.7 and containing less than 20% by weight of diisocyanate, based on the weight of polyisocyanate, B) at least one catalyst for the reaction of the isocyanate group with OH groups, C) at least one blowing agent having a boiling point of less than −10° C. at 1013 mbar, D) at least one foam stabilizer, and E) optionally an additive selected from solvents, flame-proofing agents and plasticizers.

23. A process as in claim 22 including adding a polyol to said composition.

24. A process as in claim 23 including adding a monofunctional compound containing isocyanate-reactive groups to said composition.

25. A process as in claim 24 including reacting said isocyanate prepolymer with a polyol and said monofunctional compound containing isocyanate-reactive groups in a single-stage or two-stage process.

26. A process as in claim 22 wherein said composition contains 50 to 90% by weight of said isocyanate prepolymer, 0.1 to 5% by weight of said catalyst, 5 to 35% by weight of said blowing agent, and 0.1 to 5% by weight of said foam stabilizer, based on the weight of said composition.

27. A process as in claim 22 including replacing up to 50% by weight of the NCO prepolymers of said triisocyanate with a low monomer content NCO prepolymer selected from the group consisting of tolylene diisocyanate, hexamethylene diisocyanate, isophorone diisocyanate and diols having a molecular weight of 60 to 3,000, a low monomer content cyclotrimer of aliphatic diisocyanates containing 4 to 12 carbon atoms, a prepolymer of diphenyl methane diisocyanate containing 50 to 90% by weight of 2,4-diphenyl methane diisocyanate and diols having a molecular weight of 60 to 3,000 wherein said prepolymer has a monomer content of less than 1% by weight.

* * * * *